United States Patent
Ryu et al.

(10) Patent No.: US 9,207,437 B2
(45) Date of Patent: Dec. 8, 2015

(54) IMAGING LENS

(75) Inventors: Yonghak Ryu, Seoul (KR); Jinyoung Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 3 days.

(21) Appl. No.: 14/239,246

(22) PCT Filed: Jul. 27, 2012

(86) PCT No.: PCT/KR2012/006016
§ 371 (c)(1),
(2), (4) Date: Feb. 17, 2014

(87) PCT Pub. No.: WO2013/024979
PCT Pub. Date: Feb. 21, 2013

(65) Prior Publication Data
US 2014/0198395 A1 Jul. 17, 2014

(30) Foreign Application Priority Data
Aug. 17, 2011 (KR) .................. 10-2011-0081732

(51) Int. Cl.
*G02B 13/18* (2006.01)
*G02B 13/00* (2006.01)
*G02B 9/60* (2006.01)
*G02B 9/62* (2006.01)
*G02B 13/06* (2006.01)

(52) U.S. Cl.
CPC *G02B 13/18* (2013.01); *G02B 9/60* (2013.01); *G02B 9/62* (2013.01); *G02B 13/0045* (2013.01); *G02B 13/06* (2013.01)

(58) Field of Classification Search
CPC .... G02B 13/0045; G02B 13/06; G02B 13/18; G02B 9/60; G02B 9/62
See application file for complete search history.

(56) References Cited

U.S. PATENT DOCUMENTS

2007/0139793 A1 6/2007 Kawada

FOREIGN PATENT DOCUMENTS

| JP | 2007-286577 A | 11/2007 |
| JP | 2008-233610 A | 10/2008 |
| JP | 2008-304777 A | 12/2008 |
| JP | 2009-042377 A | 2/2009 |
| JP | 2009-092798 A | 4/2009 |

OTHER PUBLICATIONS

Partial European Search Report in European Application No. 12823370.7, dated Mar. 6, 2015.
International Search Report in International Application No. PCT/KR2012/006016, filed Jul. 27, 2012.

*Primary Examiner* — David N Spector
(74) *Attorney, Agent, or Firm* — Saliwanchik, Lloyd & Eisenschenk

(57) ABSTRACT

According to exemplary embodiments of the present invention, an imaging lens includes, in an ordered way from an object side, a first lens having negative (−) refractive power, a second lens having negative (−) refractive power, a third lens having positive (+) refractive power, a fourth lens having positive (+) refractive power, a fifth lens having negative (−) refractive power, and a sixth lens having negative (−) refractive power, wherein, a conditional expression of $0.5 < Y6/Y10 < 0.55$ is satisfied, where a height of a point 60% of a highest height of an image-forming surface is Y6, a full size of an opposite angle within an active area of an image sensor is Y10.

20 Claims, 1 Drawing Sheet

IMAGING LENS

CROSS-REFERENCE TO RELATED APPLICATIONS

This application is the U.S. national stage application of International Patent Application No. PCT/KR2012/006016, filed Jul. 27, 2012, which claims priority to Korean Application No. 10-2011-0081732, filed Aug. 17, 2011, the disclosures of each of which are incorporated herein by reference in their entirety.

TECHNICAL FIELD

The teachings in accordance with exemplary embodiments of this invention relate generally to an imaging lens.

BACKGROUND ART

Recently, vigorous research efforts are being made in the field of a mobile phone-purpose camera module, a digital still camera (DSC), a camcorder, and a PC camera (an imaging device attached to a person computer) all connected with an image pick-up system. One of the most important components in order that a camera module related to such an image pickup system obtains an image is an imaging lens producing an image.

A conventional imaging module has failed to show approving optic characteristics or aberration characteristics. Accordingly, a high-resolution imaging lens of a new power structure is required.

DISCLOSURE OF INVENTION

Technical Problem

Accordingly, embodiments of the present invention may relate to an imaging lens that substantially obviates one or more of the above disadvantages/problems due to limitations and disadvantages of related art, and it is an object of the present invention to provide an imaging lens.

Technical problems to be solved by the present invention are not restricted to the above-mentioned, and any other technical problems not mentioned so far will be clearly appreciated from the following description by skilled in the art.

Solution To Problem

An imaging lens according to one exemplary embodiment of the present invention is characterized by in an ordered way from an object side: a first lens having negative (−) refractive power; a second lens having negative (−) refractive power; a third lens having positive (+) refractive power; a fourth lens having positive (+) refractive power; a fifth lens having negative (−) refractive power, and a sixth lens having positive (+) refractive power, wherein, a conditional expression of $0.5 < Y6/Y10 < 0.55$ is satisfied, where a height of a point 60% of a highest height of an image-forming surface is Y6, a full size of an opposite angle within an active area of an image sensor is Y10.

Preferably, but not necessarily, a conditional expression of $0.9 < Y/(2*f\,TAN(u/2)) < 1.2$ is satisfied, where a highest height of an image-forming surface is Y, and an incident angle is u.

Preferably, but not necessarily, a conditional expression of $0.9 < SD\,S2/RDY\,S2 < 0.95$ is satisfied, where a semi-diameter of an image side surface of the first lens is SD S2, and a curvature radius of the image side surface of the first lens is RDY S2.

Preferably, but not necessarily, a conditional expression of $-0.5 < Y/(f \times \tan \Theta d) < 0$ is satisfied, where a highest height of an image-forming surface is Y, an entire focus distance of the imaging lens is f, and a maximum semi view angle of optical system is Θd.

Preferably, but not necessarily, the first lens takes a meniscus form convexly formed at an object side surface.

Preferably, but not necessarily, at least one surface of the second lens is aspheric.

Preferably, but not necessarily, object side surfaces and image side surfaces of the third, fourth and sixth lenses are all convexly formed.

Preferably, but not necessarily, an object side surface and an image side surface of the fifth lens are all concavely formed.

Preferably, but not necessarily, the fifth lens and the sixth lens are mutually bonded.

Preferably, but not necessarily, the fifth lens and the sixth lens are separated at a predetermined distance.

Preferably, but not necessarily, the fifth lens and the sixth lens are formed in one lens group.

An imaging lens according to another exemplary embodiment of the present invention is characterized by in an ordered way from an object side: a first lens having negative (−) refractive power; a second lens having negative (−) refractive power; a third lens having positive (+) refractive power; a fourth lens having positive (+) refractive power; a fifth lens having negative (−) refractive power, and a sixth lens having positive (+) refractive power, wherein, the fifth lens and the sixth lens form a lens group, and conditional expressions of $0.9 < Y/(2*f\,TAN(u/2)) < 1.2$ and $-0.5 < Y/(f \times \tan \Theta d) < 0$ are satisfied, where a highest height of an image-forming surface is Y, an incident angle is u, an entire focus distance of the imaging lens is f, and a maximum semi view angle of optical system is ed.

Preferably, but not necessarily, a conditional expression of $0.5 < Y6/Y10 < 0.55$ is satisfied, where a height of a point 60% of a highest height of an image-forming surface is Y6, a full size of an opposite angle within an active area of an image sensor is Y10.

Preferably, but not necessarily, a conditional expression of $0.9 < SD\,S2/RDY\,S2 < 0.95$ is satisfied, where a semi-diameter of an image side surface of the first lens is SD S2, and a curvature radius of the image side surface of the first lens is RDY S2.

Preferably, but not necessarily, the first lens takes a meniscus form convexly formed at an object side surface.

Preferably, but not necessarily, at least one surface of the second lens is aspheric.

Preferably, but not necessarily, object side surfaces and image side surfaces of the third, fourth and sixth lenses are all convexly formed.

Preferably, but not necessarily, an object side surface and an image side surface of the fifth lens are all concavely formed.

Preferably, but not necessarily, the fifth lens and the sixth lens are mutually bonded.

Preferably, but not necessarily, the fifth lens and the sixth lens are separated at a predetermined distance.

Advantageous Effects of Invention

The imaging lens according to one exemplary embodiment of the present invention have advantageous effects in that a highest height can be raised and no image shading (hidden image) phenomenon is generated at a corner of an image-forming surface, such that an image can be realized without distortion correction using a sensor and algorithm.

BEST MODE FOR CARRYING OUT THE INVENTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
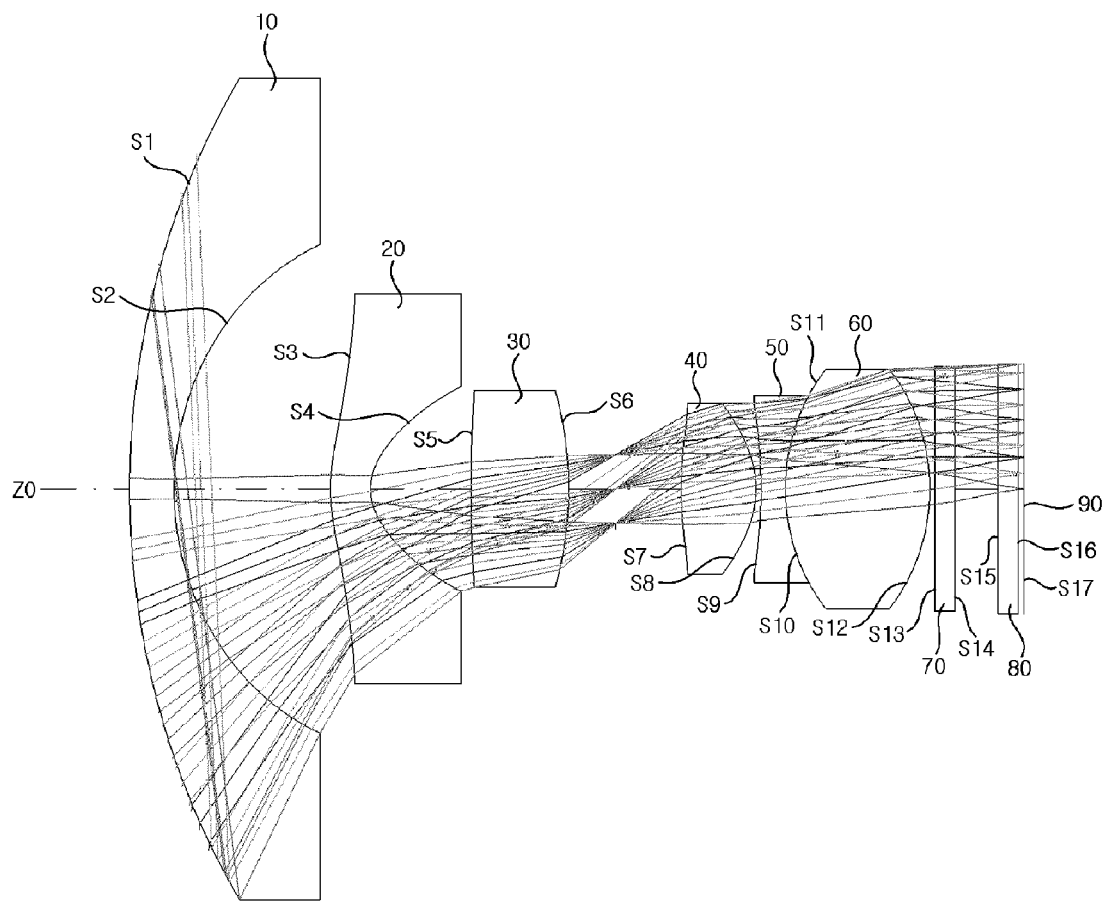
FIG. 1 is a schematic view illustrating configuration of a camera lens module according to an exemplary embodiment of the present invention.
Figure 2:
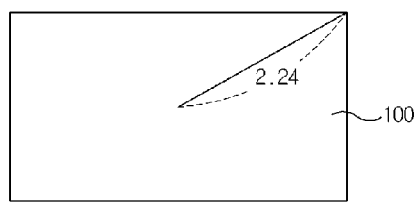
FIG. 2 is a schematic view illustrating a highest height of an image-forming surface according to an exemplary embodiment of the present invention.
Figure 3:
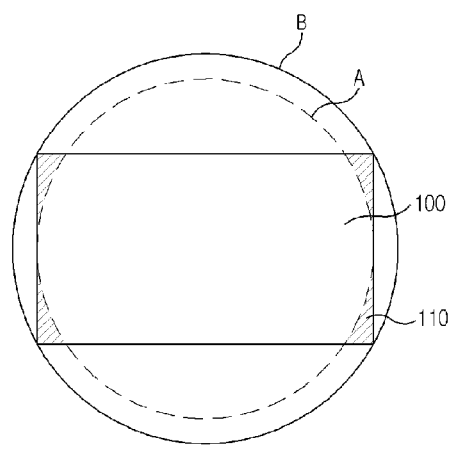
FIG. 3 is a schematic conceptual view illustrating an optical beam formed on an image forming surface through an imaging lens according to an exemplary embodiment of the present invention and an imaging lens according to a comparative example.

The disclosed embodiments and advantages thereof are best understood by referring to FIGS. 1-3 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity.

Like numbers refer to like elements throughout and explanations that duplicate one another will be omitted. Now, the present invention will be described in detail with reference to the accompanying drawings.

Words such as "thus," "then," "next," "therefore", etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Now, the imaging lens according to exemplary embodiments of the present invention will be described in detail with reference to the accompanying drawings.

FIG. 1 is a schematic view illustrating configuration of a camera lens module according to an exemplary embodiment of the present invention.

The camera lens module according to an exemplary embodiment of the present invention includes an image lens including a plurality of lenses about an optical axis (ZO), where thickness, size, and shape of a lens are rather overdrawn for description, and a spherical shape or an aspheric shape has been only presented as one exemplary embodiment, but obviously not limited to this shape.

Referring to FIG. 1, the camera lens module according to an exemplary embodiment of the present invention has a layout construction with a first lens (10), a second lens (20), a third lens (30), a fourth lens (40), a fifth lens (50), a sixth lens (60), a filter (70), and a photo-detector (90), in an ordered way from an object side.

Light corresponding to image information of a subject passes the first lens (10), the second lens (20), the third lens (30), the fourth lens (40), the fifth lens (50), the sixth lens (60) and the filter (70), and is incident on the photo detector (90).

That is, the imaging lens according to the exemplary embodiment of the present invention includes 6 pieces of lenses including the first lens (10), the second lens (20), the third lens (30), the fourth lens (40), the fifth lens (50), and the sixth lens (60).

Thus, the imaging lens according to the exemplary embodiment of the present invention can advantageously raise a highest height of the imaging lens to thereby prevent an image shading (hidden image) phenomenon from occurring at a corner of an image-forming surface. Furthermore, the imaging lens according to the exemplary embodiment of the present invention can obtain an image height of a sensor using stereographic projection method and realize relative illumination (rate) and high resolution. The photo-detector (90) may be arranged with a cover glass (80).

Hereinafter, in the description of the construction of each lens, "object side surface" means the surface of a lens facing an object side with respect to an optical axis, "image side surface" means the surface of the lens facing an imaging surface with respect to the optical axis, and image side surface" means the surface of the lens a capturing surface with respect to an optical axis.

In the specification, "imaging" basically may refer to the process in which an imaging lens receives light from a subject in the field and outputs an image (image signal and image data) indicating the same. However, if the imaging lens is repeatedly generating the image indicating the subject in the field at a predetermined cycle, "imaging" may mean the process of storing a specific image out of the images generated by the imaging lens in a storage unit. In other words, from a certain standpoint, "imaging" may mean a process in which the imaging lens acquires an image indicating the content of the subject in the field and having the same in a state subjectable to the measurement process at a certain intended timing.

The first lens (10) has negative (−) refractive power and takes a meniscus form convexly formed at an object side surface (S1). The second lens (20) has negative (−) refractive power and has at least one surface in aspheric shape. The third lens (30), the fourth lens (40) and the sixth lens (60) have positive (+) refractive powers, and are convexly formed at an object side surface and an image side surface. The fifth lens (50) has negative (−) refractive power, and is concavely formed at an object side surface and an image side surface. Furthermore, the fifth and sixth lenses (50, 60) may form a lens group, may be bonded together or separated at a predetermined distance.

For information, 'S1' of FIG. 1 is an object side surface, 'S2' is an image side surface of the first lens (10), 'S3' is an object side surface of the second lens (20), 'S4' is an object side surface of the second lens (20), 'S5' is an object side surface of the third lens (30), 'S6' is an object side surface of the third lens (30), S7' is an object side surface of the fourth lens (40), 'S8' is an image side surface of the fourth lens (40), 'S9' is an object side surface of the fifth lens (50), 'S10' is an image side surface of the fifth lens (50), 'S11' and 'S12' are respectively an object side surface and an image side surface of the sixth lens (60), and 'S13' and 'S14' are respectively an object side surface and an image side surface of the filter (70).

The filter (70) may be any one optical filter selected from an infrared filter and a cover glass. The filter (70), if applied with the infrared filter, blocks radiant heat emitted from external light from being transferred to the photo-detector (90). Furthermore, the infrared filter transmits visible light and reflects infrared rays to output it to the outside. The photo-detector (90) is an image sensor, for example, CCD (Charge Coupled Device) or CMOS (Complementary Metal Oxide Semiconductor), etc.

Because the later-described conditional expressions and exemplary embodiments are preferred embodiments enhancing an effect of interaction, it would be obvious to those skilled in the art that the present invention is not necessarily comprised of the following conditions. For example, only by satisfying some conditions of later-described conditional expressions, the lens construction (framework) of the present invention may have an enhanced effect of interaction.

$0.9 < SD\ S2/RDY\ S2 < 0.95$ [Conditional expression 1]

$-0.5 < Y/(f \times \tan \Theta d) < 0$ [Conditional expression 2]

$0.5 < Y6/Y10 < 0.55$ [Conditional expression 3]

$0.9 < Y/(2*f\ TAN(u/2)) < 1.2$ [Conditional expression 4]

where, SD S2: semi-diameter of image side surface of first lens,
RDY S2: curvature radius of image side surface of first lens,
Y: highest height of image-forming surface,
f: entire focus distance of imaging lens,
Θd: maximum semi-view angle of optical system,
Y6: height of an area 60% of highest height,
Y10: full size of opposite angle within an active area of image sensor, and
u: incident angle.

The conditional expression 1 defines workability obtainment of first lens (10), conditional expressions 2 and 4 define stereographic projection condition, and conditional expression 3 defines a condition relative to removal of distortion.

Furthermore, the highest height is defined by a height of an image formed on an image forming surface, where unit is mm.

Hereinafter, the action and effect of the present invention will be described with reference to a specific exemplary embodiment. Aspheric mentioned in a later-exemplary embodiment is obtained from a known Equation 1, and 'E and its succeeding number' used in Conic constant k and aspheric coefficient A, B, C, D, E, F indicates 10's power. For example, E+01 denotes 10.sup.1, and E−02 denotes 10.sup.-2.

$$z = \frac{cY^2}{1 + \sqrt{1-(1+K)c^2Y^2}} + AY^2 + BY^4 + CY^4 + DY^4 + EY^4 + FY^4 + \ldots$$ [Equation 1]

where, z: distance from the lens's top-point to an optical axis direction,
c: basic curvature of a lens, Y: distance towards a direction perpendicular to an optical axis, K: conic constant, and A, B, C, D, E, F: aspheric coefficients.

Exemplary Embodiment

The following Table 1 shows an exemplary embodiment matching the afore-mentioned conditional expressions.

TABLE 1

| | Exemplary embodiment |
|---|---|
| Θd(FOV/2) | 98 |
| TTL | 18 |
| Y | 2.24 |
| F | 1.02 |

Referring to Table 1, the maximum semi view angle 'Θd' is 98, a distance to an image forming surface from the first lens of optical 'TTL' is 18 mm, a highest height 'Y' of the image forming surface, which is a half value of opposite angle of the image forming surface 2.24 mm, as shown in FIG. 2, and entire focus distance of the imaging lens of 'f' is 1.02.

The following Table 2 shows an exemplary embodiment which is a more detailed exemplary embodiment over that of Table 1.

TABLE 2

| Surface Number | Material | Curvature radius (R) | Thickness or distance (d) | Refractive index (N) |
|---|---|---|---|---|
| 1* | Glass | 13.4752389651 | 0.884709713505 | 1.883 |
| 2* | | 4.75743907524 | 3.11316705518 | |
| 3* | Plastic | 2.84182427785 | 0.8 | 1.535 |

TABLE 2-continued

| Surface Number | Material | Curvature radius (R) | Thickness or distance (d) | Refractive index (N) |
|---|---|---|---|---|
| 4* | | 0.853169759875 | 2.00157063458 | |
| 5* | Glass | 23.0529728319 | 1.94657295028 | 1.84666 |
| 6* | | −5.9139580845 | 0.940151235593 | |
| Stop | | Infinity | 1.3 | |
| 8* | Plastic | 5.16460652831 | 1.48869278599 | 1.535 |
| 9* | | −1.62403135829 | 0.1 | |
| 10* | Glass | −8.49840930864 | 0.486 | 1.922859 |
| 11* | Glass | 3.26397517462 | 2.874 | 1.620141 |
| 12* | | −3.26397517462 | 0.1000 | |
| 13* | IR filter | Infinity | 0.4000 | 1.516798 |
| 14* | | Infinity | 0.860813684671 | |
| 15* | Cover glass | Infinity | 0.4000 | 1.516798 |
| 17* | | Infinity | 0.1043 | |
| Image | | Infinity | 0 | |

The notation * in the above Table 2 and following Table 3, which is further written near the surface number indicates aspheric. The following Table 3 shows a value of aspheric coefficient of each lens in the exemplary embodiment of Table 2.

TABLE 3

| Surface number | K | A | B | C |
|---|---|---|---|---|
| 3* | −7.17888024266 | −0.2104168240153 | 0.00506480424131 | −0.000702529903152 |
| 4* | −0.843506733099 | −0.0935154377641 | 0.0111559679708 | 0.00202118011268 |
| 8* | 8.64848245529 | −0.0368859242747 | 0.00521940328382 | 0.00030094567962 |
| 9* | −1.00847673283 | 0.012748565704 | −0.00514549516548 | 0.00295596031934 |

| Surface number | D | E | F |
|---|---|---|---|
| 3* | 5.7223627534e−005 | −2.5857822654e−006 | 5.04325444364e−008 |
| 4* | −0.00082165718523 | −0.000107875318328 | 1.88465951809e−005 |
| 8* | −0.00102333697547 | | |
| 9* | −0.00063932148679 | | |

Mode for the Invention

FIG. 3 is a schematic conceptual view illustrating an optical beam formed on an image forming surface through an imaging lens according to an exemplary embodiment of the present invention and an imaging lens according to a comparative example.

As mentioned above, the imaging lens according to an exemplary embodiment of the present invention has an advantage in that a highest height can be increased and no image shading (hidden image) phenomenon is generated at a corner of an image-forming surface, such that an image can be realized without distortion correction using a sensor and algorithm.

That is, referring FIG. 3, an optical beam (A) formed on an image forming surface through an imaging lens according to an exemplary embodiment of the present invention and an imaging lens according to a conventional comparative example having a different optical system is not formed on an entire area of an image forming surface (100), and an image shading (hidden image) phenomenon is generated on a peripheral area (110, hatched area) of the image forming surface (100), which is then corrected by a sensor and algorithm.

At this time, even if the imaging lens according to the comparative example is same as the imaging lens according to an exemplary embodiment of the present invention in terms of shape of lens and configuration, the imaging lens according to the comparative example fails to satisfy the aforesaid conditional expressions 1 to 4. Furthermore, the number of the imaging lens according to the comparative example is so huge that there is no need to explain further herein.

Meanwhile, as mentioned in the foregoing, the imaging lens according to an exemplary embodiment of the present invention is an optical lens capable of increasing a highest height, an optical beam is so formed as to cover an entire area of the image forming surface as shown in 'B' of FIG. 3 to thereby prevent generation of image shading (hidden image) phenomenon.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

As apparent from the foregoing, the imaging lens according to the exemplary embodiments of the present invention has an industrial applicability in that a highest height can be increased and no image shading (hidden image) phenomenon is generated at a corner of an image-forming surface, such that an image can be realized without distortion correction using a sensor and algorithm.

The invention claimed is:
1. An imaging lens, comprising, in an ordered way from an object side:
   a first lens having negative (−) refractive power;
   a second lens having a negative (−) refractive power;
   a third lens having positive (+) refractive power;
   a fourth lens having positive (+) refractive power;
   a fifth lens having negative (−) refractive power; and
   a sixth lens having positive (+) refractive power;
   wherein an object side surface of the fourth lens is convexly formed,
   wherein an object side surface of the sixth lens is convexly formed, and
   wherein a conditional expression of $0.5 < Y6/Y10 < 0.55$ is satisfied, where a height of a point 60% of a highest height of an image-forming surface is Y6 and a full size of an opposite angle within an active area of an image sensor is Y10.

2. The imaging lens of claim 1, wherein a conditional expression of $0.9 < Y/(2*f\ TAN(u/2)) < 1.2$ is satisfied, where a highest height of an image-forming surface is Y, and an incident angle is u.

3. The imaging lens of claim 1, wherein a conditional expression of $0.9 < SD\ S2/RDY\ S2 < 0.95$ is satisfied, where a semi-diameter of an image side surface of the first lens is SD S2, and a curvature radius of the image side surface of the first lens is RDY S2.

4. The imaging lens of claim 1, wherein a conditional expression of $-0.5 < Y/f \times tan\ \Theta d < 0$ is satisfied, where a highest height of an image-forming surface is Y, an entire focus distance of the imaging lens is f, and a maximum semi view angle of optical system is $\Theta d$.

5. The imaging lens of claim 1, wherein the first lens takes a meniscus form convexly formed at an object side surface.

6. The imaging lens of claim 1, wherein at least one surface of the second lens is aspheric.

7. The imaging lens of claim 1, wherein object side surfaces and image side surfaces of the third, fourth and sixth lenses are all convexly formed.

8. The imaging lens of claim 1, wherein an object side surface and an image side surface of the fifth lens are all concavely formed.

9. The imaging lens of claim 1, wherein the fifth lens and the sixth lens are mutually bonded.

10. The imaging lens of claim 1, wherein the fifth lens and the sixth lens are separated at a predetermined distance.

11. The imaging lens of claim 1, wherein the fifth lens and the sixth lens are formed in one lens group.

12. The imaging lens, comprising, in an ordered way from an object side:
 a first lens having negative (−) refractive power;
 a second lens having negative (−) refractive power;
 a third lens having positive (+) refractive power;
 a fourth lens having positive (+) refractive power;
 a fifth lens having negative (−) refractive power; and
 a sixth lens having positive (+) refractive power;
 wherein, the fifth lens and the sixth lens form a lens group,
 wherein an object side surface of the fourth lens is convexly formed,
 wherein an object side surface of the sixth lens is convexly formed, and
 wherein conditional expressions of $0.9 < Y/(2*f\ TAN(u/2)) < 1.2$ and $-0.5 < Y/(f \times tan\ \Theta d) < 0$ are satisfied, where a highest height of an image-forming surface is Y, an incident angle is u, an entire focus distance of the imaging lens is f, and a maximum semi view angle of optical system is $\Theta d$.

13. The imaging lens of claim 12, wherein a conditional expression of $0.5 < Y6/Y10 < 0.55$ is satisfied, where a height of a point 60% of a highest height of an image-forming surface is Y6, a full size of an opposite angle within an active area of an image sensor is Y10.

14. The imaging lens of claim 12, wherein a conditional expression of $0.9 < SD\ S2/RDY\ S2 < 0.95$ is satisfied, where a semi-diameter of an image side surface of the first lens is SD S2, and a curvature radius of the image side surface of the first lens is RDY S2.

15. The imaging lens of claim 12, wherein the first lens takes a meniscus form convexly formed at an object side surface.

16. The imaging lens of claim 12, wherein at least one surface of the second lens is aspheric.

17. The imaging lens of claim 12, wherein object side surfaces and image side surfaces of the third, fourth and sixth lenses are all convexly formed.

18. The imaging lens of claim 12, wherein an object side surface and an image side surface of the fifth lens are all concavely formed.

19. The imaging lens of claim 12, wherein the fifth lens and the sixth lens are mutually bonded.

20. The imaging lens of claim 12, wherein the fifth lens and the sixth lens are separated at a predetermined distance.

* * * * *